(12) United States Patent
Bernreuther et al.

(10) Patent No.: US 10,030,698 B2
(45) Date of Patent: Jul. 24, 2018

(54) BEARING RING FOR ROLLING-ELEMENT BEARING

(71) Applicant: AKTIEBOLAGET SKF, Göteborg (SE)

(72) Inventors: Philipp Bernreuther, Waigolshausen (DE); Volker Dibal, Niederwerrn (DE); Michael Reugels, Knetzgau (DE)

(73) Assignee: AKTIEBOLAGET SKF, Gothenburg (SE)

( * ) Notice: Subject to any disclaimer, the term of this patent is extended or adjusted under 35 U.S.C. 154(b) by 99 days.

(21) Appl. No.: 15/240,517

(22) PCT Filed: Feb. 6, 2015

(86) PCT No.: PCT/EP2015/052519
§ 371 (c)(1),
(2) Date: Aug. 18, 2016

(87) PCT Pub. No.: WO2015/124444
PCT Pub. Date: Aug. 27, 2015

(65) Prior Publication Data
US 2017/0175809 A1    Jun. 22, 2017

(30) Foreign Application Priority Data

Feb. 20, 2014 (DE) .................. 10 2014 203 112
Aug. 21, 2014 (DE) .................. 10 2014 216 627

(51) Int. Cl.
| | | |
|---|---|---|
| F16C 33/58 | (2006.01) | |
| F16C 19/22 | (2006.01) | |
| F16C 19/36 | (2006.01) | |
| F16C 33/60 | (2006.01) | |
| F16C 43/06 | (2006.01) | |

(52) U.S. Cl.
CPC .......... F16C 19/225 (2013.01); F16C 19/364 (2013.01); F16C 33/605 (2013.01); F16C 43/06 (2013.01)

(58) Field of Classification Search
CPC .... F16C 19/225; F16C 19/364; F16C 19/383; F16C 19/385; F16C 19/386; F16C 19/388; F16C 33/585; F16C 33/605; F16C 43/06
See application file for complete search history.

(56) References Cited

U.S. PATENT DOCUMENTS

| | | |
|---|---|---|
| 1,617,319 A | 2/1927 | Buckwalter |
| 1,992,682 A | 2/1935 | Walters |
| (Continued) | | |

FOREIGN PATENT DOCUMENTS

| | | |
|---|---|---|
| DE | 1899221 U | 8/1964 |
| DE | 7603570 U1 | 3/1976 |
| (Continued) | | |

Primary Examiner — Phillip A Johnson
(74) Attorney, Agent, or Firm — Bryan Peckjian; SKF USA Inc. Patent Dept.

(57) ABSTRACT

A bearing ring for a rolling-element bearing includes a rolling-element raceway that is axially delimited by a guide flange and a retaining flange. At least the retaining flange is configured as a separate element that is fixedly connectable to the bearing ring, and the bearing ring includes a substantially radially extending stop that is offset inward from an axial end of the bearing towards the raceway.

19 Claims, 2 Drawing Sheets

(56) References Cited

U.S. PATENT DOCUMENTS

| | | | | |
|---|---|---|---|---|
| 2,195,795 A | * | 4/1940 | Baker | ............... F16C 19/364 |
| | | | | 384/564 |
| 2,747,951 A | | 5/1956 | Wallgren | |
| 3,578,831 A | | 5/1971 | Scheifele | |
| 3,960,419 A | * | 6/1976 | Brawley | ............. F16C 19/26 |
| | | | | 384/571 |
| 4,060,290 A | * | 11/1977 | Brawley | ............ F16C 19/364 |
| | | | | 29/898.066 |
| 5,228,788 A | | 7/1993 | Vinciguerra | |

FOREIGN PATENT DOCUMENTS

| | | | | |
|---|---|---|---|---|
| GB | 364860 A | | 1/1932 | |
| GB | 405903 A | | 2/1934 | |
| GB | 474143 A | | 10/1937 | |
| JP | 2005069350 A | | 3/2005 | |
| JP | 2006322504 A | * | 11/2006 | ......... F16C 33/6696 |
| JP | 2007205456 A | | 8/2007 | |
| JP | 2007263212 A | * | 10/2007 | ........... F16C 19/364 |
| JP | 2008281121 A | | 11/2008 | |
| JP | 2010060006 A | * | 3/2010 | ........... F16C 19/364 |
| JP | 2012163168 A | | 8/2012 | |
| JP | 2012219822 A | | 11/2012 | |

* cited by examiner

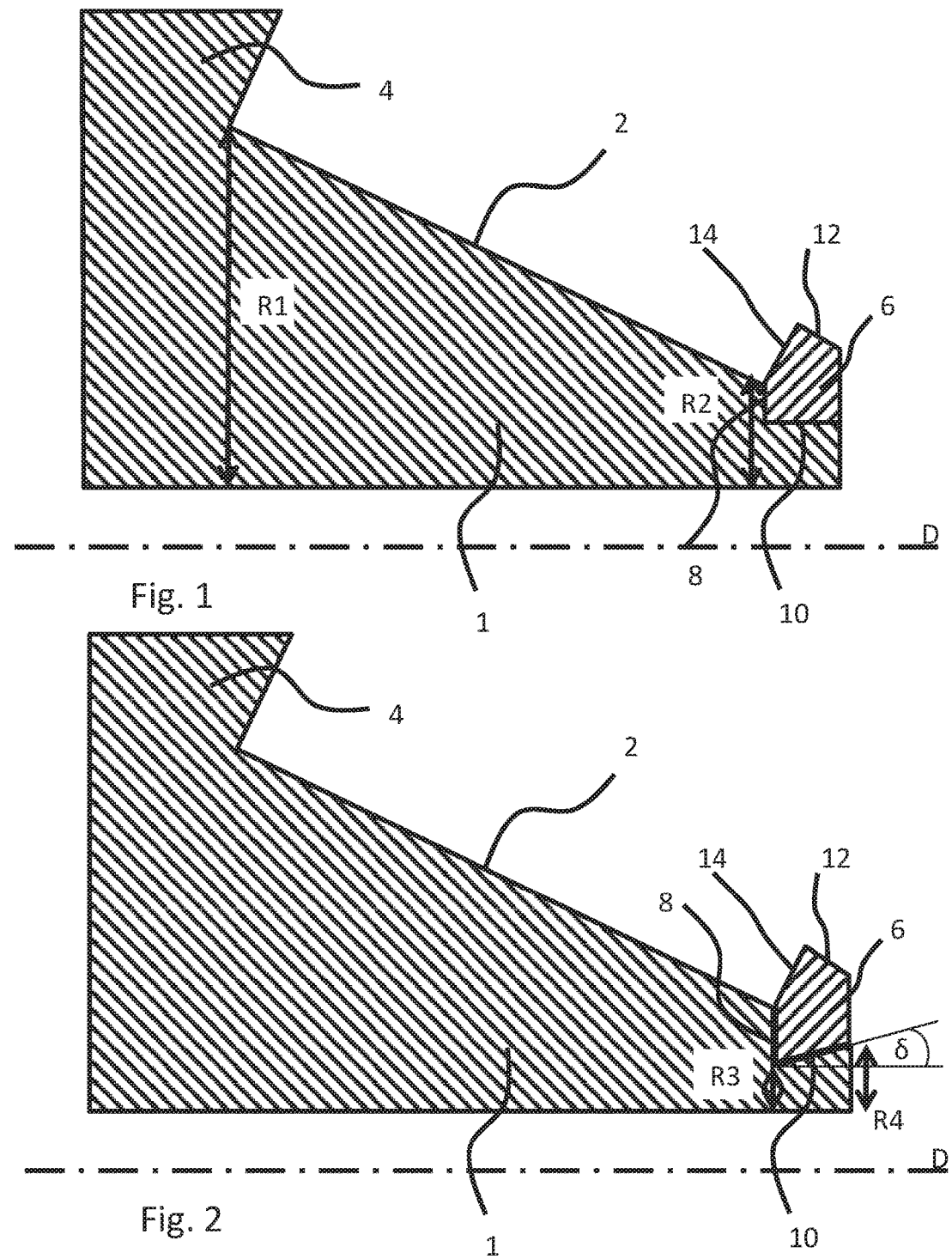

BEARING RING FOR ROLLING-ELEMENT BEARING

CROSS-REFERENCE

This application is the U.S. National Stage of International Application No. PCT/EP2015/052519 filed on Feb. 6, 2015, which claims priority to German patent application no. 10 2014 203 112.5 filed on Feb. 20, 2014 and German patent application no. 10 2014 216 627.6 filed Aug. 21, 2014.

TECHNOLOGICAL FIELD

The present invention relates to a bearing ring for a rolling-element bearing, including a rolling-element raceway that is axially delimited by a guide flange and a retaining flange, wherein at least the retaining flange is configured as a separate element that is fixedly connected to the bearing ring.

BACKGROUND

Bearing rings for rolling-element bearings, i.e., bearing inner rings or bearing outer rings, generally include at least one raceway for rolling elements, which raceway circulates about a bearing axis and is largely concentrically disposed with respect to the bearing axis. This raceway is delimited by so-called flanges, namely a guide flange and a retaining flange, wherein the flanges, as the name already says, serves for guiding (guide flange) and supporting (retaining flange) of the rolling elements. In particular in tapered roller bearings the guide flange supports the axial forces of the rolling elements arising in operation and is accordingly embodied large. In contrast, the retaining flange only exercises a retaining function that prevents a falling-out of the rolling elements, for example, during transport or installation. It can therefore also be configured smaller.

The flanges are typically formed one-piece with the bearing ring. However, in comparison to flangeless rolling-element bearings the manufacturing of a bearing ring with flanges formed one-piece is very complex and cost-intensive. In addition, in particular with processing with a turning tool, limitations arise with respect to the geometric design of the flanges, which limitations result from the running-in of the turning tool. For this reason special tools are necessary in order to form the entire raceway including the flange, and turning tools with cutting inserts must be used, which cutting inserts have a very small radius. Such cutting inserts are in turn very expensive.

Solutions are therefore known from the prior art wherein in particular the retaining flange is embodied by a separate component. Thus, for example, DE 1899221 U or also DE 102009050817 disclose that the retaining flange is placed on the bearing ring and is fixedly connected thereto. However, with both retaining flanges known from the prior art it is disadvantageous that great care must be taken during installation that the retaining flange is attached at a defined axial position of the bearing ring. A defined axial position of the retaining flange is in turn necessary in order to be able to provide a prespecified clear flange width wherein the rolling elements can be received. In the bearing rings known from the prior art a precise arrangement of the retaining flange is only possible via additional positioning tools. The installation of the retaining flange is thereby made difficult, which is in turn time- and cost-intensive.

In addition, in particular in tapered roller bearings that have an inclined raceway the retaining flange used can loosen from the bearing ring, for example due to heating in operation, and slip off of the bearing ring.

SUMMARY

The object of the present invention is therefore to provide a bearing ring with a separately produced retaining flange, wherein a simple and secure positioning of the retaining flange is possible.

According to the invention a bearing ring is provided for a rolling-element bearing, including a rolling-element raceway that is axially delimited by a guide flange and a retaining flange, wherein at least the retaining flange is configured as a separate element and is fixedly connected to the bearing ring. Here the invention is based on the idea of forming an essentially radially extending stop on the bearing ring, which stop is offset axially inward toward the raceway. This inventive radial stop makes possible an exact positioning of the retaining flange on the bearing ring without great installation effort so that the retaining flange can be mounted on the bearing ring quickly and in an error-free manner.

According to a further advantageous exemplary embodiment the axial stop establishes a defined axial position of the retaining flange, wherein the axial position preferably defines a maximum clear flange width between guide flange and retaining flange. So that after assembly the rolling elements are quickly guided in operation on the guide flange and the retaining flange is no longer impinged with force, the clear flange width, i.e., the spacing between guide flange and retaining flange, should be adapted as optimally as possible to the axial length of the rolling elements, while simultaneously the clearance of the rolling elements between the flanges should be minimized. Since the inventive stop makes it possible to precisely axially position the retaining flange, a bearing ring can be provided whose clearance between rolling elements and guide flange or retaining flange is minimized and whose raceway is maximized, since no installation errors or installation uncertainties need to be considered. At the same time this means that more raceway is available for the rolling elements, which in turn increases the load capacity of the bearing.

According to a further advantageous exemplary embodiment the retaining flange is connected to the bearing ring in a friction-fit, material-bonded, and/or interference-fit manner, wherein it is preferably shrunk-on and/or adhered-on. The retaining flange can thereby be attached to the bearing ring in a particularly simple manner. In addition the retaining flange, and also the bearing ring, is usually produced with a turning tool, so that their surfaces are not ideally flat. This in turn means that after the shrinking-on process the retaining flange is fixable in its position on the one hand by a clamping effect, however on the other hand also by catching of the turning irregularities against each other. Furthermore it can be provided to additionally secure the retaining flange in its position by adhering. Here the proposed forms of connection offer the advantage that they ensure a simple and fast assembly. Since in addition the flange in operation is usually not impinged by force, the shrinking-on or adhering-on is sufficient as form of connection for the loads to be expected.

Furthermore, in an advantageous manner an essentially axially extending retaining-flange receiving surface can also be formed on the bearing ring, wherein the radial stop axially inwardly delimits the retaining-flange receiving surface. Axially outward the retaining flange can directly terminate with the bearing ring, however, it is also possible that the bearing ring extends axially farther outward than the retaining flange, or the retaining flange extends axially over the outer edge of the bearing ring. If the bearing ring is configured axially longer, another seal, for example, can be attached to the protruding part.

In particular retaining flanges are known from the prior art that in tapered roller bearings can be attached directly to the inclined raceway. However, even with the to-be-expected low loads of the retaining flange the attaching to the included raceway presents a problem, since the retaining flanges cannot be sufficiently attached to the bearing ring and thereby move relatively easily towards the small diameter and can slip off of the inclined raceway of the inner ring. In contrast, the inventive essentially axially extending retaining-flange receiving surface offers a better seat for the retaining flange, and simultaneously a minimal loosening of the retaining flange does not simultaneously mean that the retaining flange slips from the bearing ring. Such a minimal loosening can occur, for example, in the event of a heating of the bearing in operation, so that the clamping seat of the retaining flange loosens somewhat. The cylindrical shoulder furthermore has the advantage that the shoulder need not be configured as deep as a groove known from the prior art into which a retaining flange can be received. A greater wall thickness thereby remains, which in turn contributes to an increased stability.

Alternatively, as a further preferred exemplary embodiment shows, the retaining flange surface can also be configured inclined with respect to the axis of rotation, whereby a conical receptacle is formed on the bearing ring. Here it is preferred in particular if the incline drops off towards the radial stop and rises towards the outer circumference, thus a conical receptacle is formed having a smaller diameter in the radial stop and a larger diameter at the bearing-ring end. This has the advantage that a retaining ring disposed on the bearing ring is even better secured. Here it is preferred in particular if the angle of the conical receptacle is <5° with respect to the axis of rotation.

Here according to a further advantageous exemplary embodiment the retaining-flange receiving surface and the radial stop are formed as a cylindrical shoulder so that the radial stop extends from the retaining-flange surface up to the raceway. Such a design is in particular simple and easy to manufacture using turning tools with conventional cutting inserts so that the bearing ring can be simply and cost-effectively manufactured.

According to a further advantageous exemplary embodiment the retaining flange has at least one rolling-element contact bevel facing the raceway and/or a rolling-element mounting bevel facing the outer circumference of the bearing. Here the rolling-element contact bevel serves in particular to retain and simultaneously not to damage the rolling elements. The alternatively or additionally provided rolling-element mounting bevel serves in particular to arrange a retaining flange already attached to the bearing ring prior to the installation of the rolling elements such that the rolling elements can be snapped into their raceway via the retaining flange. In order to make possible as damage-free as possible a snapping-in of the rolling elements, it can be provided in particular here that an edge formed between rolling-element contact bevel and rolling-element mounting bevel is configured as a rounded-off edge.

According to a further advantageous exemplary embodiment the rolling-element contact bevel is configured essentially perpendicular to the raceway, wherein an angle between rolling-element contact bevel and raceway preferably falls in the range of approximately 80° to 100°. A rolling-element contact bevel configured in this manner makes possible a particularly good supporting with simultaneous minimal risk of damage of the rolling element.

According to a further advantageous exemplary embodiment the retaining flange includes a support surface configured essentially parallel to the retaining-flange receiving surface and/or a stop surface configured essentially parallel to the radial stop. Here the support surface of the retaining flange can preferably be disposed on the retaining-flange receiving surface with friction-fit and/or material-bonding. Because of this support surface and stop surface the retaining flange can be precisely positioned on the bearing ring and sufficiently fixedly connected to the bearing by the friction-fit or material-bonded connection.

Here it is preferred in particular if a retaining-flange mounting surface configured substantially bevelled is formed between the stop surface and the support surface. This retaining-flange mounting surface on the one hand facilitates the pushing-on of the retaining flange on the bearing ring; on the other hand with a cylindrical or conical shoulder on the bearing ring, which shoulder is formed using turning tools, it can thereby also be ensured that the retaining flange contacts the radial stop with its stop surface, whereby a defined axial position of the retaining flange can be achieved. The reason for a not-sufficient contacting is often that during formation of the cylindrical or conical shoulder, i.e., of the retaining-flange receiving surface and of the radial stop, no precise edge can be provided, rather, in the transition between the stop surface and the retaining-flange receiving surface a material accumulation remains. The retaining-flange mounting surface here provides a sufficient empty space wherein the material accumulation is receivable so that the retaining flange can directly contact the radial stop with its stop surface. Preferably here the retaining-flange mounting surface is configured at an angle to the support surface in the range from approximately 120° to 150°.

A further aspect of the present invention relates to a rolling-element bearing, in particular a tapered roller bearing including a bearing ring, as described above. According to a further aspect a retaining flange for a bearing ring, as described above, is suggested.

Further advantages and advantageous embodiments are defined in the claims, the drawings, and the description.

In the following the invention is described in more detail with reference to the exemplary embodiments depicted in the Figures. Here the exemplary embodiments are of a purely exemplary nature and are not intended to establish the scope of the application. This scope is defined solely by the pending claims.

BRIEF DESCRIPTION OF THE DRAWINGS

FIG. 1 shows a schematic sectional depiction through a bearing ring according to a first exemplary embodiment with an inventively attached retaining flange;

FIG. 2 shows a schematic section depiction through a bearing ring according to a second exemplary embodiment with an inventively attached retaining flange;

DETAILED DESCRIPTION

Figures 3A, 3B, 3C, 3D:
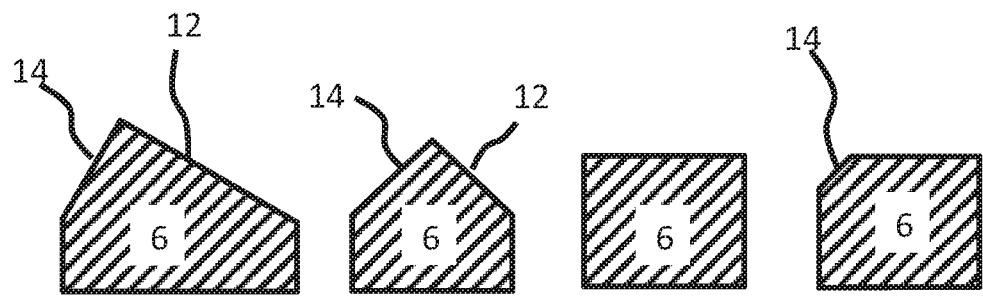
FIG. 3 shows schematic depictions of different inventive retaining flanges.

In the following, identical or functionally equivalent elements are designated by the same reference numbers.

FIG. 1 schematically shows a sectional view through a bearing ring 1, in particular a bearing ring of a not-depicted rolling-element bearing, wherein in particular the bearing ring 1 of a tapered roller bearing is depicted. As FIG. 1 shows, in tapered roller bearings a raceway 2 is formed on the bearing ring 1, which raceway 2 has a first large diameter $R_1$ and a second small diameter $R_2$ so that the raceway 2 itself is inclined relative to an axis of rotation D. The rolling elements not depicted in FIG. 1, which are usually conical in tapered roller bearings, run along the raceway 2 itself; the rolling elements are usually disposed in a bearing cage in a known manner. In order to fix the rolling elements in their position on the bearing ring 1 and ensure that they also do not leave their axial position during operation of the bearing, the raceway 2 is delimited by a guide flange 4 that is disposed on the larger diameter $R_1$. During operation the rolling elements are supported against this guide flange 4. In order to be able to withstand this pressure the guide flange 4 is preferably formed one-piece with the bearing ring 1 as FIG. 1 shows.

So that the rolling elements are also secured in their position and do not slip out of the bearing even during transport or installation, a retaining flange 6 is furthermore disposed at the small diameter $R_2$ of the bearing ring 1, which retaining flange 6 remains essentially unloaded during operation of the bearing. The retaining flange 6 also primarily serves to secure the rolling elements in their position during installation or transport. Furthermore, retaining flange 6 and guide flange 4 define a so-called clear flange width between them, which simultaneously establishes the maximum longitudinal length of the to-be-received rolling elements.

It applies here that the load capacity of the bearing is greater the larger the axial length of the rolling elements is configured. However, in order to be able to receive the rolling elements in the receptacle formed between guide flange 4 and retaining flange 6, it is necessary that a certain clearance remains between guide flange 4 and the rolling elements and/or between the rolling elements and retaining flange 6. This clearance must be larger the greater an axial positional uncertainty is in the assembly of the retaining flange 6.

In order to minimize the axial positional uncertainty of the retaining flange 6, according to the invention the bearing ring 1 includes an essentially radial stop 8 that defines the axial position of the retaining flange 6.

Furthermore, FIG. 1 shows that not only an essentially radial stop 8 is formed on the bearing ring 1, but also a retaining-flange receiving surface 10 configured essentially parallel to the axis of rotation D, onto which retaining-flange receiving surface 10 the retaining flange 6 is pushed-on. In other words, in the bearing ring 1 shown in FIG. 1 a cylindrical shoulder is provided that is designed for the receiving of the retaining flange 6.

Alternatively to the cylindrical receptacle depicted in FIG. 1 it is also possible, as FIG. 1 shows, to form a conical receptacle. That means that the retaining-flange receiving surface 10 is not configured essentially parallel to the axis of rotation, but rather angled with respect thereto. Here the angular formation is preferably designed such that the bearing ring at the radial stop 8 has a third diameter $R_3$ that is smaller than a fourth diameter $R_4$ at the outer end of the bearing ring so that the conical receptacle falls off towards the radial stop. However, the radial stop 8 can furthermore be essentially radially configured. As can further be seen from FIG. 2, an angle of inclination δ is relatively small, preferably smaller than 5°, in order to make possible a pushing-on of the retaining flange.

Axially outward the retaining flange 6 can radially terminate with the bearing ring 1. However, it is also possible that the bearing ring 1 extends axially outward over the retaining flange 6 so that a ring surface remains on which further bearing elements, such as, for example, a seal, are mountable. Of course, however, the retaining flange 6 can also protrude axially over the bearing ring 1.

In both designs shown in FIGS. 1 and 2 it is provided in particular that the retaining flange 6 is attached to the bearing ring 1 by shrinking-on. A shrinking-on can thereby be achieved, for example, in that the retaining flange 6 is heated, thereby expands in a manner dependent on the material, and is pushable-onto the bearing ring in the hot state. With cooling of the retaining flange 6 it contracts again so that a press-fit is formed of the retaining flange 6 on the retaining-flange receiving surface 10. Here the radial stop 8 serves as an axial limit so that the retaining flange 6 is disposed in an axially clearly defined position on the bearing ring 1. Here the retaining-flange receiving surface 10 configured essentially parallel to the axis of rotation additionally ensures that even with an excessively high heating of the retaining flange it cannot slip from the bearing ring but remains at its position.

If both the retaining-flange support surface 10 and the retaining flange 6 itself are formed using a turning tool, material irregularities are available on the contact surfaces that can additionally ensure a catching of the retaining flange 6 on the bearing ring 1. It is thereby ensured that even with loading of the retaining flange 6 radially outward the retaining flange 6 does not slip from its position. Alternatively or additionally it is of course also possible to adhere the retaining flange on the bearing ring 1.

FIG. 1 and FIG. 2 further show that the retaining flange 6 can additionally have two bevels, namely a rolling-element mounting surface 12 and a rolling-element retaining surface 14, wherein the rolling-element mounting surface serves to push a rolling element over the retaining flange 6 as simply as possible in order to allow it to be snapped-in in the receptacle 15 between guide flange 4 and retaining flange 6. In contrast, the rolling-element retaining surface 14 provides a non-destrucive-as-possible retaining of the rolling elements in or on the raceway 2.

However, as can be seen in particular in FIG. 3, the retaining flange 6 can also have completely different designs, wherein, such as can be seen, for example, from FIGS. 3a and 3b, the rolling-element retaining surface 14 and the rolling-element mounting surface 12 can be configured differently in terms of length or steepness. Here its design is preferably defined via the specified geometries of the bearing ring, in particular the raceway and the rolling elements, and adapted thereto. Here the rolling-element mounting surface 12 can be configured flatter (see FIG. 3a) or steeper (see FIG. 3b) or longer (see FIG. 3a) or shorter (see FIG. 3b). The rolling-element retaining surface 14 is also defined via the prespecified geometries.

Of course it is also possible, as FIG. 3c shows, to also design the retaining flange 6 without rolling-element mounting surface 12 or rolling-element retaining surface 14, but rather to choose a simple rectangular cross-section. Here it is then preferred in particular to attach the retaining flange 6 only after the installation of the rolling elements on the bearing ring 1. Alternatively to the design shown in FIG. 3, as FIG. 3d shows, a rudimentarily configured rolling-element retaining surface 14 can also be formed on the retaining flange 6 with an embodiment without rolling-element mounting surface 12 and snap-mechanism, which rolling-element retaining surface 14 substantially ensures a damage-free retaining of the rolling elements.

Figure 4:
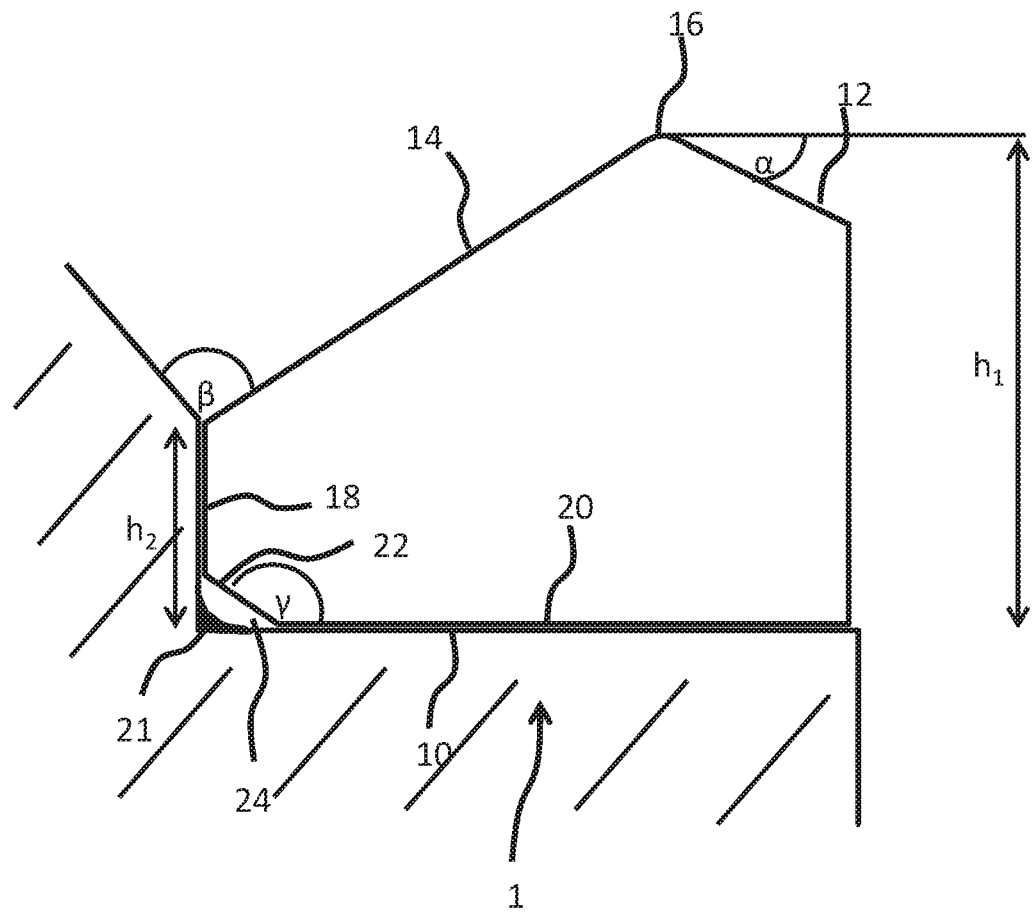
FIG. 4 shows a schematic sectional view through a particularly preferred exemplary embodiment of the inventive retaining flange.

FIG. 4 shows, enlarged, a further design of the inventive retaining flange 6 with a rolling-element mounting surface 12 and a rolling-element retaining surface 14, wherein an edge 16 is formed between rolling-element retaining surface 14 and rolling-element mounting surface 12, which edge, as FIG. 4 shows, is configured rounded-off. This rounded-off formation serves in particular to not damage the rolling elements and/or the cage in the event of a pushing-over over the edge 16. The angulation of the rolling-element mounting surface 12, see angle α, or the angulation of the rolling-element retaining surface 14, see angle β, are preferably adapted to the geometries of the bearing ring and of the rolling elements or of the cage receiving the rolling elements. It is advantageous in particular if the angle β formed between raceway 2 and rolling-element retaining surface 14 is a substantially right angle, where the angle β can generally fall in the range between 80° and 100°. A total height $H_1$ of the retaining flange 6 or a height $H_2$ of the stop surface is also defined via the geometry of the bearing ring 1. Furthermore, FIG. 4 shows that a stop surface 18 is formed on the retaining flange 6 itself, which stop surface 18 is designed to directly contact the stop 8. In addition, FIG. 4 shows that a support surface 20 is provided that in turn directly contacts the retaining-flange receiving surface 10 and against which the friction-fit connection of the retaining flange 6 to the bearing ring 1 is formed.

Since the cylindrical receptacle on the bearing ring 1 is usually produced by turning, a certain material accumulation 21 remains between support surface 10 and stop 8 so that no precise edge can be formed. In order to nevertheless provide a defined positioning of the retaining flange 6 on the stop 8 with the stop surface 18, a retaining-flange mounting surface 22 is furthermore advantageously formed on the retaining flange 6, so that also no right angle is formed between stop surface 18 and receiving surface 20. An empty space is thereby provided in which the material accumulation 21 is receivable. Here the angulation of the retaining-flange mounting surface 22 with respect to the receiving surface 20 (see angle γ) usually falls in a range between 120° and 150° or is configured such that the material accumulation 21 can be received in the empty space 24 preferably in a contact free manner. Furthermore, the retaining-flange mounting surface 22 makes possible a simple pushing-on of the retaining flange 6 on the bearing ring 1.

Finally it should be noted that the retaining flange 6 can be manufactured from the same material as the bearing ring 1, in particular from steel, and thus provides a high stability. However, it is also possible to form the retaining flange from a different material or from a different material composition. Even a formation from plastic or a carbon-containing material is conceivable.

Overall the inventive design of the bearing ring makes possible a defined positioning of the retaining flange 6 so that the installation-dependent clearance to be provided between the flanges 4, 6 and the rolling elements can be kept as small as possible. This in turn makes possible the enlarging of the raceways and thus a greater load capacity of the rolling-element bearing. Furthermore, via the inventive retaining-flange mounting surface 22 the retaining flange 6 can on the one hand be simply pushed-on onto the cylindrical shoulder, and on the other hand even with a manufacturing-related material accumulation 21 between stop 8 and retaining-flange receiving surface 10, the stop surface 18 can contact the radial stop 8 of the bearing ring, whereby in turn the axial position of the retaining flange 6 is precisely definable. Furthermore the retaining flange 6 can sill be formed from high-strength material, in particular steel, wherein a friction-fit is possible via shrinking-on. The retaining-flange stop surface is configured essentially parallel or inclined with respect to the axis of rotation as well as an additionally usable adhesive for a securing of the retaining flange against slipping-off from the bearing ring.

REFERENCE NUMBER LIST

1 Bearing ring
2 Raceway
4 Guide flange
6 Retaining flange
8 Stop surface
10 Retaining-flange receiving surface
12 Rolling-element mounting surface
14 Rolling-element retaining surface
16 Edge
18 Stop surface
20 Receiving surface
22 Retaining-flange mounting surface
21 Material accumulation
24 Empty space
$R_1$ Large diameter on the bearing ring
$R_2$ Small diameter on the bearing ring
$R_3$ Small diameter on the bearing ring
$R_4$ Large diameter on the bearing ring
$H_1$ Total height of the retaining flange
$H_2$ Height of the stop surface

The invention claimed is:

1. A bearing ring for a rolling-element bearing, comprising:
    a rolling-element raceway that is axially delimited by a guide flange and a retaining flange configured as a separate element that is fixedly connectable to the bearing ring, the retaining flange having a stop surface and a rolling-element retaining surface extending in a radially outward direction from the stop surface to a rolling-element mounting surface, the rolling-element mounting surface extending in a radially inward direction from the rolling-element retaining surface to an axial surface, the axial surface extending radially from the rolling-element mounting surface towards the bearing, and
    a stop formed in the bearing ring, the stop extending substantially in a radial direction, and offset inward from an axial end of the bearing towards the raceway.

2. The bearing ring according to claim 1, wherein the stop is configured to establish a defined axial position of the retaining flange, and wherein the axial position defines a maximum clear flange width between the guide flange and the retaining flange.

3. The bearing ring according to claim 1, wherein the retaining flange is connected to the bearing ring in a friction-fit, material-bonded, and/or interference-fit manner, and wherein the retaining flange is shrunk-on and/or adhered-on.

4. The bearing ring according to claim 3, further comprising:
    a retaining flange receiving surface on the bearing ring, wherein the retaining flange includes a support surface substantially parallel to the retaining flange receiving surface and the stop surface is substantially parallel to the stop, wherein the support surface of the retaining flange is disposed on the retaining-flange receiving surface with a friction-fit and/or with a material-bonding.

5. The bearing ring according to claim 4, wherein the retaining flange includes an oblique retaining-flange mounting surface between the retaining flange stop surface and the retaining flange support surface, and
wherein an angle ($\gamma$) between the retaining-flange mounting surface and the retaining flange support surface is 120° to 150°.

6. The bearing ring according to claim 1, wherein a substantially axially extending retaining-flange receiving surface is formed on the bearing ring, and wherein the stop delimits the retaining-flange receiving surface axially inward toward the raceway, and wherein the retaining-flange receiving surface extends radially and axially with respect to an axis of rotation of the bearing ring.

7. The bearing ring according to claim 6, wherein the stop extends from the retaining-flange receiving surface to the raceway.

8. The bearing ring according to claim 1, wherein a substantially axially extending retaining-flange receiving surface is formed on the bearing ring, and wherein the stop delimits the retaining-flange receiving surface axially inward toward the raceway, and wherein the retaining-flange receiving surface is inclined with respect to an axis of rotation of the bearing ring towards the radial stop at an angle of inclination ($\delta$) of less than 5°.

9. The bearing ring according to claim 1, wherein the bearing ring has an axis of rotation, and
wherein the rolling-element retaining surface extends radially and axially with respect to the axis of rotation of the bearing and extends between the stop surface and the rolling-element mounting surface and the rolling-element retaining surface faces the raceway, and
the rolling-element mounting surface extends radially and axially with respect to the axis of rotation of the bearing.

10. The bearing ring according to claim 9, wherein the rolling-element retaining surface is substantially perpendicular to the raceway.

11. The bearing ring according to claim 9, wherein an angle ($\beta$) between the rolling-element retaining surface and the raceway is 80° to 100°.

12. A tapered rolling-element bearing including the bearing ring according to claim 1.

13. The bearing ring according to claim 1, wherein the rolling-element retaining surface faces the raceway and the rolling-element mounting surface faces away from the raceway.

14. The bearing ring according to claim 13, wherein an edge formed between the rolling-element retaining surface and the rolling-element mounting surface is rounded.

15. The bearing ring according to claim 1,
wherein the bearing ring includes a substantially axially extending retaining-flange receiving surface and the stop extends from the raceway to the retaining-flange receiving surface,
wherein the retaining flange is connected to the bearing ring in a friction-fit, material-bonded, and/or interference-fit manner,
wherein the rolling-element retaining surface is substantially perpendicular to the raceway and facing the guide flange and the rolling-element mounting surface facing away from an axis of rotation of the bearing ring, and
wherein the retaining flange includes a first surface mounted flush against the stop and a second surface mounted flush against the retaining-flange receiving surface and wherein the first surface is connected to the second surface by an oblique wall spaced from the stop and spaced from the retaining-flange receiving surface, and wherein the oblique wall and the stop and the retaining-flange receiving surface define a hollow space in the bearing ring.

16. A bearing ring for a rolling-element bearing, the bearing ring having an axis of rotation and comprising:
a raceway having a first end and a second end axially spaced from the first end;
a guide flange at the first end of the raceway,
a stop surface extending in toward the axis of rotation from the second end of the raceway,
a retaining-flange receiving surface extending substantially axially away from the stop surface, and
a retaining flange mounted on the bearing ring and having a first surface in direct contact with the stop surface, a second surface in direct contact with the retaining-flange receiving surface, a rolling-element retaining surface extending in a radial direction away from the bearing and facing the guide flange and a rolling-element mounting surface extending in the radial direction from the rolling-element retaining surface towards the bearing.

17. The bearing ring according to claim 16, wherein the second end is radially spaced from the first end.

18. The bearing ring according to claim 17, including an oblique surface connecting the first surface and the second surface, wherein the oblique surface, the stop surface and the retaining-flange receiving surface define an annular hollow space in the bearing ring.

19. A tapered rolling-element bearing including the bearing ring according to claim 18.

* * * * *